United States Patent
Roudeau et al.

(10) Patent No.: US 7,706,952 B2
(45) Date of Patent: Apr. 27, 2010

(54) METHOD FOR CONTROLLING A SET TORQUE TO BE APPLIED TO WHEELS OF AN AUTOMATIC TRANSMISSION FOR A MOTOR VEHICLE AND CORRESPONDING DEVICE

(75) Inventors: Frederic Roudeau, Vitry sur Seine (FR); Jean Bretheau, Antony (FR); Thomas Turpin, Orsay (FR)

(73) Assignee: Renault S.A.S., Boulonge Billancourt (FR)

( * ) Notice: Subject to any disclaimer, the term of this patent is extended or adjusted under 35 U.S.C. 154(b) by 402 days.

(21) Appl. No.: 11/596,864

(22) PCT Filed: May 30, 2005

(86) PCT No.: PCT/FR2005/050386

§ 371 (c)(1),
(2), (4) Date: Feb. 2, 2007

(87) PCT Pub. No.: WO2005/119033

PCT Pub. Date: Dec. 15, 2005

(65) Prior Publication Data
US 2007/0250239 A1 Oct. 25, 2007

(30) Foreign Application Priority Data
May 28, 2004 (FR) .................................. 04 05802

(51) Int. Cl.
*G06F 19/00* (2006.01)
*G06F 7/00* (2006.01)

(52) U.S. Cl. ............................ 701/60; 701/51; 701/52; 477/34

(58) Field of Classification Search .................. 701/51, 701/52, 59, 60; 477/34
See application file for complete search history.

(56) References Cited

U.S. PATENT DOCUMENTS

| 5,082,096 A | 1/1992 | Yamashita et al. |
| 2002/0049525 A1 | 4/2002 | Speicher et al. |
| 2007/0282508 A1 * | 12/2007 | Roudeau et al. |

FOREIGN PATENT DOCUMENTS

| EP | 0 952 324 | 10/1999 |
| FR | 2 681 908 | 4/1993 |
| FR | 2 724 432 | 3/1996 |
| FR | 2 827 339 | 1/2003 |
| GB | 2 368 406 | 5/2002 |
| WO | 02 078996 | 10/2002 |
| WO | 03 006842 | 1/2003 |

* cited by examiner

*Primary Examiner*—Gertrude Arthur Jeanglaud
(74) *Attorney, Agent, or Firm*—Oblon, Spivak, McClelland, Maier & Neustadt, P.C.

(57) ABSTRACT

A method for controlling an automatic transmission of a power train for a motor vehicle, including producing a first set torque signal to be applied to the wheels, which represents wishes of the motor vehicle driver and that includes two components: a static component and a dynamic component. The dynamic component of the set signal is filtered according to at least two predetermined thresholds that define at least three distinct filtering zones. A filter of order n is used in the first and the third filtering zone and, in the second filtering zone, a maximum slope is imposed upon the dynamic component of the first set signal, the maximum slope being adjustable according to predetermined input data.

14 Claims, 3 Drawing Sheets

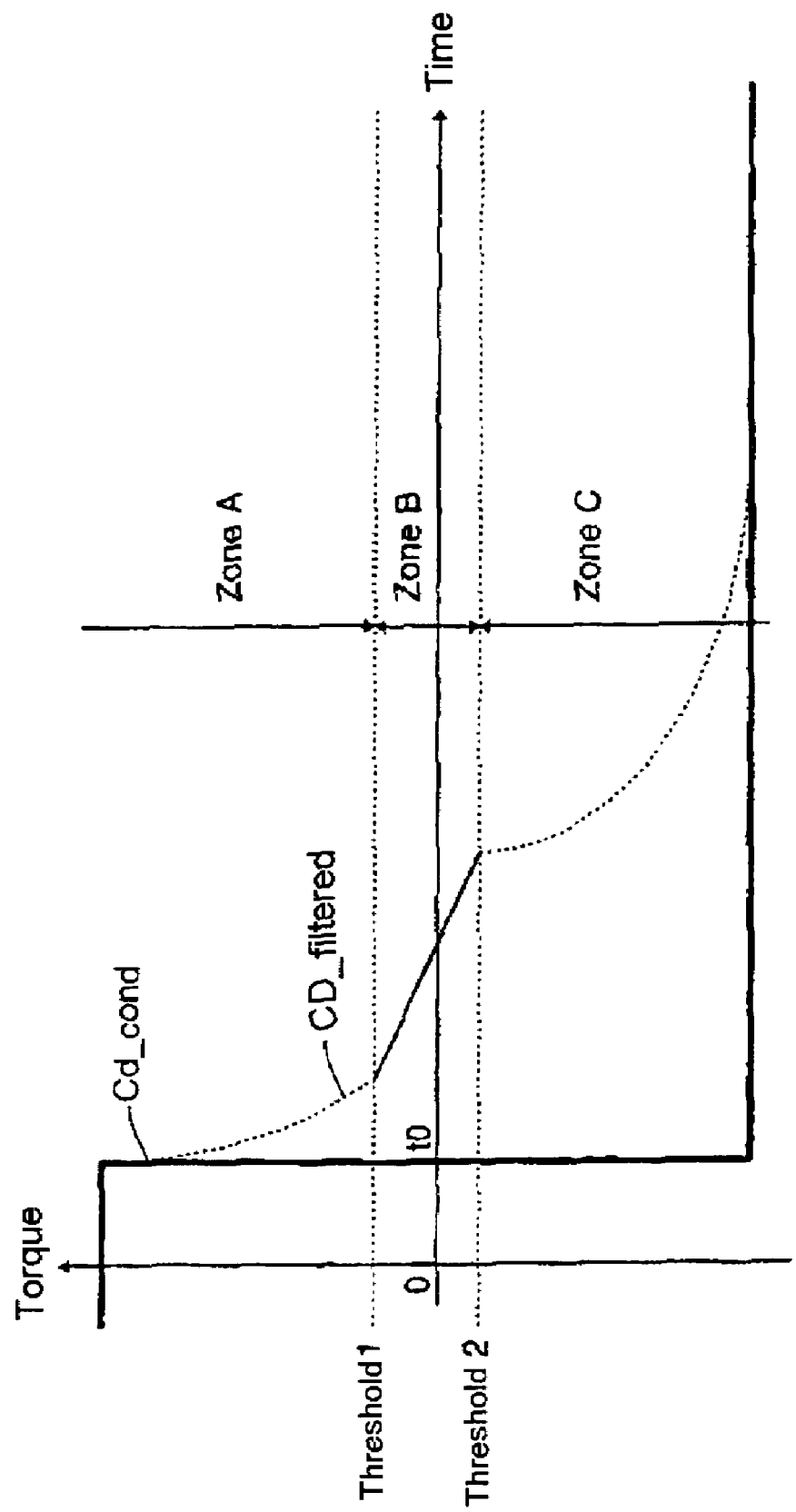

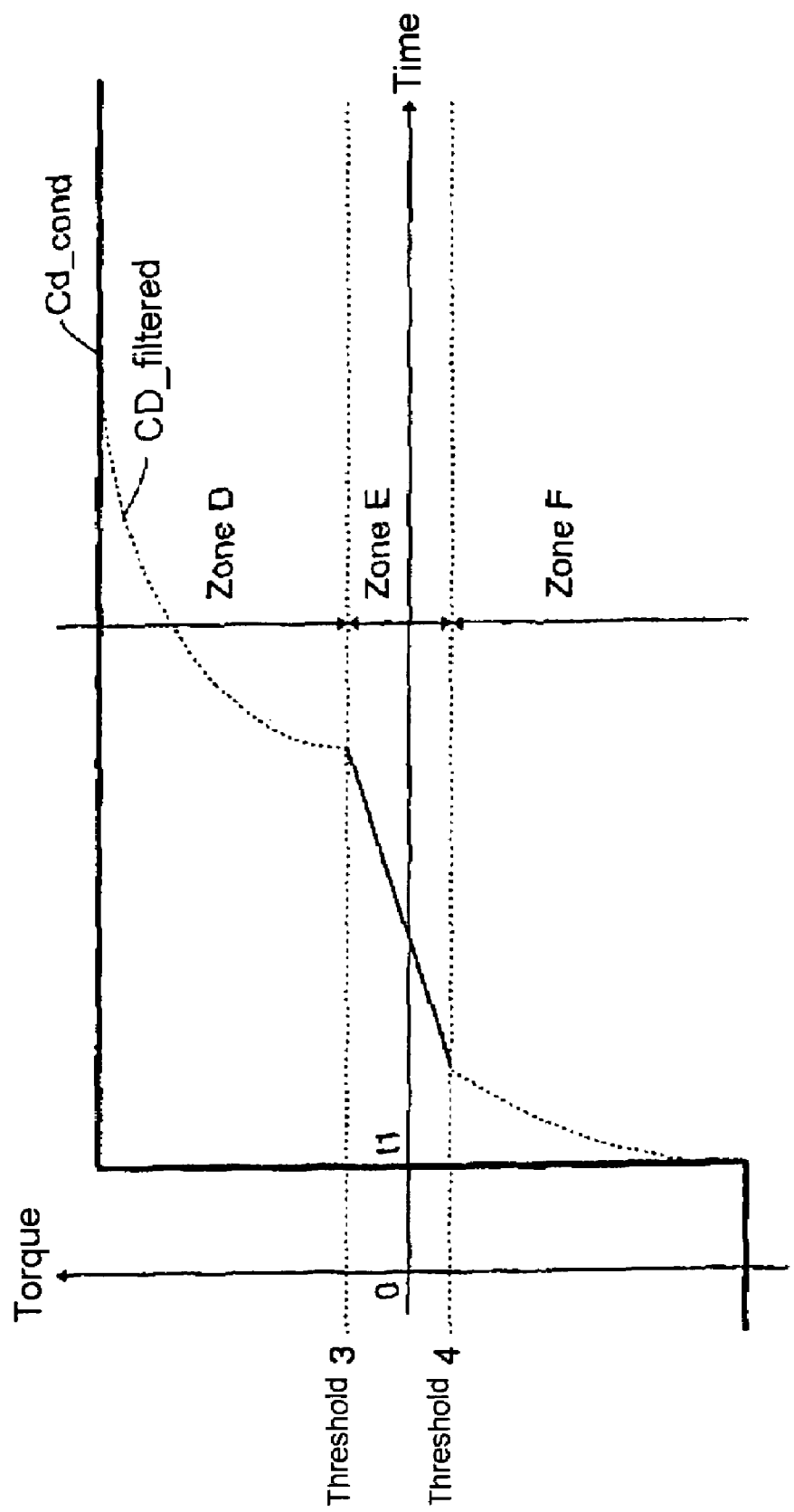

METHOD FOR CONTROLLING A SET TORQUE TO BE APPLIED TO WHEELS OF AN AUTOMATIC TRANSMISSION FOR A MOTOR VEHICLE AND CORRESPONDING DEVICE

TITLE OF THE INVENTION

Method for controlling a set torque to be applied to Wheels of an automatic transmission for a motor vehicle and corresponding device

BACKGROUND OF THE INVENTION

I. Field of the Invention

The present invention relates to the control of the impacts following the variations of a torque set-point to be applied to the wheels.

A particularly interesting application of the invention relates to automatic transmissions, in particular so-called pulsed transmissions, BCI, so-called automatic transmissions, BVA, and so-called robotized transmissions, BVR, but also continuously variable transmissions, CVT, and infinitely variable transmissions, IVT, and hybrid transmissions.

II. Description of Related Art

A motor vehicle automatic transmission conventionally comprises a control block receiving one or more input parameters interpreting, among other things, the wishes of the driver. Then, according to the values of these parameters, the control block delivers a control set-point intended for the wheels of the motor vehicle.

Also, document FR-A-2 827 339, filed in the name of the Applicant, discloses a device for controlling the operating point of a power train intended for a motor vehicle. This device has in particular a module for interpreting the wishes of the driver called IVC module, which generates a torque set-point to be applied to the wheel intended for a block for optimizing the operating point of the power train, called OPF module.

The IVC module determines the torque set-point according to the wishes of the driver, the characteristics of the motor vehicle and its environment.

The impacts, felt by the passengers of a motor vehicle, are due to a jump in the torque set-point, which changes sign on transitions from an acceleration phase to a deceleration phase, for example. This change of sign causes a tipping movement of the power train, reflected for the passengers of the motor vehicle in jerks or impacts with respect to the driver.

In practice, most power trains have two fixing points on the body of the motor vehicle. These allow it to move between two extreme positions, according to whether the motor vehicle is accelerating or decelerating. Alternating acceleration and deceleration phases causes the power train to tip to one of these two positions to compensate for the play of the transmission assembly including that of the automatic transmission. This movement generates impacts transmitted to the driver through the chassis of the motor vehicle.

In order to limit the jerks and impacts, the invention proposes to adapt said torque set-point to be applied to the wheels.

Already known from the state of the art are methods and associated devices with which to make corrections to try to limit, or even eliminate, the impacts. They propose adjusting the parameters controlling the operation of a power train in order to limit the impact of its tipping.

Thus, document FR-2 681 908 discloses a device that can correct control parameters of an internal combustion engine, based on a model estimating the engine torque and a model estimating the transmission for each gear ratio. This device determines then the correction to be applied to the engine torque.

Also known from document FR-2 724 432 is a method of correcting the oscillations of the motor vehicle. This method consists in generating a correction value to be applied to the engine torque, based on a variable determined relative to the angular position of the crankshaft.

The corrections made by these two devices relate to the engine torque. However, on most motor vehicles, the tipping of the power train is reflected more particularly in abrupt variations of the torque to be applied to the wheels of the motor vehicle. Given that this zone of variation in the torque set-point to be applied to the wheels of the motor vehicle does not necessarily correspond to the zone of variation of the engine torque about the zero value, the impacts cannot be limited optimally by adding a correction to this engine torque.

Also known, from document GB-2 368 406, is a method for controlling the changes of sign of the output torque set-point of the power train. These are performed when the motor vehicle reaches the desired speed. The control described by document GB-2 368 406 makes it possible to avoid the impacts due to the transition.

BRIEF SUMMARY OF THE INVENTION

The object of the present invention is to propose a control strategy aimed at adapting the torque set-point to be applied to the wheels in a way that is different from those described in the abovementioned three documents and also capable of operating with any type of transmission.

To this end, the invention proposes a method of controlling an automatic transmission of a power train for a motor vehicle. It comprises a step for generating a first torque set-point signal to be applied to the wheels which is representative of the wishes of the driver of the motor vehicle and which comprises two components, respectively static and dynamic. The dynamic component of the set-point signal is filtered according to at least two predetermined thresholds defining at least three separate filtering zones. A filter of order n is used in the first and the third filtering zones and a maximum slope is imposed in the second filtering zone on the dynamic component of the first set-point signal, said maximum slope being adjustable according to predetermined input data.

This method limits the impacts due to the tipping of the power train with respect to the feelings of the driver since the filtering reduces the slope of the dynamic component of the first set-point signal as a function of the torque values reached. In practice, this control is based on the torque set-point crossing predetermined thresholds.

Preferably, the dynamic component of the set-point signal intended for the wheels of the motor vehicle is filtered according to predetermined thresholds, adjustable according to predetermined input data, and adapted to the direction of variation of said dynamic component of the set-point signal (Cdcond) intended for the wheels of the motor vehicle.

In an embodiment, the first value of the dynamic component of the filtered set-point signal of each filtering zone is initialized with the last value of the dynamic component of the filtered set-point signal of the preceding filtering zone.

Another subject of the invention is a device for controlling an automatic transmission of a power train for a motor vehicle suitable for delivering a torque set-point signal to be applied to the wheels, adapted to the wishes of the driver of the motor vehicle, comprising two components, respectively static and dynamic. The device comprises a filtering block suitable for filtering said dynamic component of the set-point signal.

According to an embodiment of the invention, the filtering block comprises means suitable for comparing with at least two predetermined thresholds, the dynamic component of the set-point signal intended for the wheels of the motor vehicle and adapted to the wishes of the driver. It also comprises means suitable for determining a filtering zone corresponding to the threshold reached by said dynamic component of the set-point signal.

According to an embodiment of the invention, the filtering block comprises means suitable for applying a filter of order n or a maximum slope to the dynamic component of the first set-point signal in the appropriate filtering zones.

BRIEF DESCRIPTION OF THE DRAWINGS

Other advantages and characteristics of the invention will become apparent from studying the detailed description of an embodiment of the invention that is by no means limiting, and the appended drawings, in which:

FIG. 2 illustrates an example of a filtering curve of a dynamic torque component with a torque jump from positive values to negative values, FIG. 3 illustrates an example of a filtering curve of a dynamic torque component with a jump from negative torque values to positive values.

DETAIL DESCRIPTION OF THE INVENTION

Figure 1:
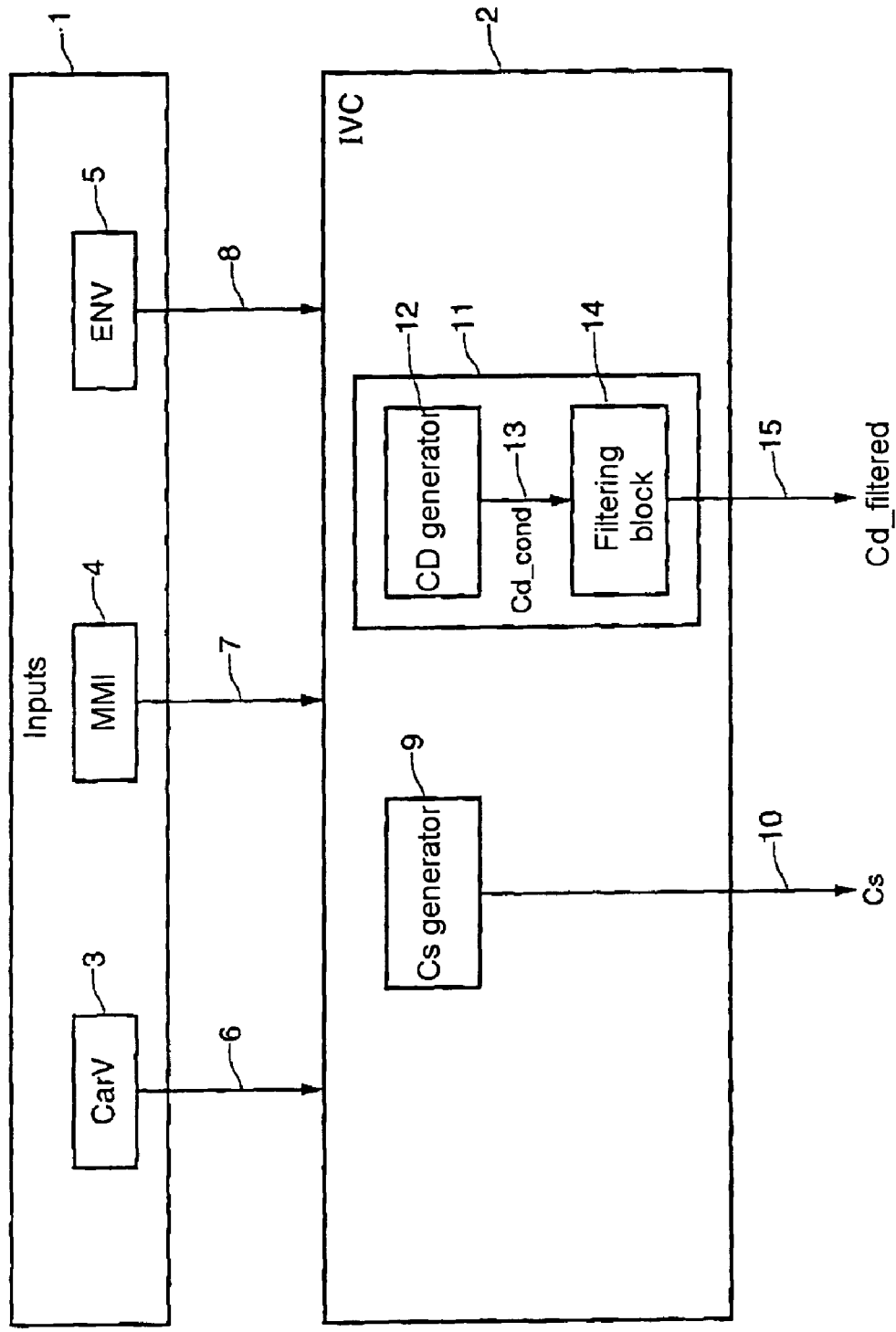
FIG. 1 is a block diagram of an exemplary embodiment of a block for interpreting the wishes of the driver, IVC.

FIG. 1 diagrammatically represents an example of an embodiment of the device according to the invention. The latter is suitable for delivering a torque set-point to be applied to the wheels of the motor vehicle. This device can be included in a gearbox for a motor vehicle automatic transmission, not shown in FIG. 1.

As illustrated in FIG. 1, the control device comprises an input block 1 transmitting data to a module for interpreting the wishes of the driver IVC 2. The input block comprises three separate modules respectively delivering data linked to the characteristics of the motor vehicle CarV 3, to the wishes of the driver MMI (man/machine interface) 4 and to the environment of the motor vehicle ENV 5. This data is delivered to the IVC-module 2 respectively via the connections 6, 7 and 8. The various data is detailed below.

The IVC module 2 comprises a block 9 generating the static component Cs (Cs generator) of the torque set-point. This component Cs is transmitted via the connection 10.

The static component Cs is defined as the future torque set-point that the driver could request and that the power train must immediately make available to the wheels of the motor vehicle. The latter changes slowly. In practice, its aim is not to respond to an immediate request from the driver, it needs to reflect a trend imposed by the behavior of the driver from a predetermined period.

The IVC module 2 also comprises a block 11 delivering the dynamic component of the torque set-point Cd_filtered.

The dynamic torque set-point defines the torque that the power train must make available as early as possible to the wheels of the motor vehicle.

The block 11 comprises a first module 12 generating a set-point Cd_cond (Cd generator) corresponding to the dynamic component of the torque set-point adapted to the wishes of the driver. The set point Cd_cond is transmitted via the connection 13 to a filtering block 14, also incorporated in the block 11. The filtering block 14 delivers as output a filtered torque set-point Cd_filtered corresponding to the dynamic component of the torque set-point Cd_cond, but filtered by the filtering block 14. The filtering block 14 is an anti-jerk filter. The filtering performed by the latter is aimed at limiting the impacts linked to the tipping of the power train. The set-point Cd_filtered is transmitted via the connection 15.

More specifically, the three modules CarV 3, MMI 4 and ENV 5 of the input block 1 are suitable for generating a data signal based on the signals obtained from sensors not shown and incorporated in the motor vehicle.

The first module CarV 3 of the input block 1 is capable of generating the data concerning the characteristics of the motor vehicle. This data is programmed and stored by the manufacturer to characterize the performance of the vehicle delivered to a customer.

The second module MMI 4 is capable of generating data concerning the wishes of the driver. This data interprets the wishes of the driver. It includes, for example, signals corresponding to the gear shift lever of the transmission of the motor vehicle or even to the brake or accelerator pedals of the motor vehicle.

The module ENV 5 is capable of generating signals relating to the environment of the motor vehicle. These can be used to take account of the state of the motor vehicle and its situation in the environment. They include, for example, signals corresponding to the speed of the motor vehicle, the road condition or even weather conditions.

The value of the parameters and the state of the variables of the input data transmitted by these three modules are stored in a memory common to each element of the device, not shown.

FIG. 2 presents the torque set-point Cd_filtered filtered by the filtering block 14 presented in FIG. 1.

The torque set-point Cd_cond changes from a positive torque to a negative torque. The set-point Cd_cond can be a stepped signal crossing the time x-axis at $t_0$. The proposed filtering is an open-ended filtering, dependent on the values reached by the torque Cd_cond, in particular to limit the effects of the abrupt transition of the torque set-point Cd_cond when it approaches "0", at $t_0$.

The filtering is performed according to two predetermined thresholds, Threshold1 and Threshold2, delimiting three separate filtering zones: ZoneA, ZoneB and ZoneC. These thresholds are detected by means (not shown) when the set-point Cd_cond varies.

When the torque set-point Cd_cond is greater than the value Threshold1, the ZoneA applies. It is then possible to generate the filtered set-point Cd_filtered by applying a filter of order n conventionally used by those skilled in the art.

When the torque set-point Cd_cond lies between the values Threshold1 and Threshold2, it is possible to obtain the filtered set-point Cd_filtered by imposing a maximum slope so that the value of the filtered set-point Cd_filtered returns to the limit value of the torque set-point Cd_cond.

The maximum slope can be calibrated by the manufacturer according to each type of motor vehicle.

Finally, if the torque set-point Cd_cond is less than the value of Threshold2, it is the ZoneC that applies. As for the ZoneA, it is possible to obtain a filtered torque set-point Cd_filtered by using a filter of order n.

In each filtering zone, ZoneA, ZoneB and ZoneC, the filter is applied by filtering means incorporated in the filtering block 14 (not shown).

Moreover, in order to guarantee the continuity of the filtered set-point Cd_filtered on changing zone, it is possible to initialize the filter with the last value taken by the filtered torque set-point Cd_filtered in the preceding zone.

The filtered set-point Cd_filtered is less disturbing than the dynamic torque component Cd_cond. In practice, a stepped signal implies the almost instantaneous transition from a positive torque value to a negative torque value. The filtering according to the invention makes it possible to soften the slope of the set-point, particularly for zero values. Furthermore, by imposing a maximum slope in the ZoneB, an optimum filtered set-point Cd_filtered response time is retained.

FIG. 3 illustrates the filtering process in the case where the set-point Cd_cond changes from a positive torque to a negative torque. The set-point Cd_cond can also be a stepped signal passing through the time x-axis at $t_1$.

In this case, the filtering is performed in the same way as for the preceding case, according to two predetermined thresholds Threshold3 and Threshold4, which respectively delimit three separate filtering areas ZoneD, ZoneE and ZoneF.

It is then possible to apply in the first and third zones a filter of order n in the same way as for the ZoneA and ZoneB of FIG. 2.

In the ZoneE, a maximum slope is imposed on the torque set-point to return to the limit value of the torque set-point Cd_cond.

Similarly, in order to ensure the continuity of the filtered set-point Cd_filtered on changing zone, it is possible to initialize the filter with the last value taken by the filtered torque set-point Cd_filtered in the preceding zone.

The value of the different thresholds, Threshold1, Threshold2, Threshold3 and Threshold4, of the maximum slopes of the zones B and E, and of the parameters for adjusting the filters of order n of the zones A, C, D and F, can be adjusted dynamically according to input data obtained from the blocks 4 and/or 5, such as the speed of the motor vehicle, driver's attitude, sporty or otherwise, or even the speed of the heat engine, for example.

The invention claimed is:

1. A method of controlling an automatic transmission of a power train for a motor vehicle, comprising:
   generating a first torque set-point signal to be applied to wheels of the vehicle, the set-point signal corresponding to inputs of a driver of the motor vehicle and including two components, respectively a static component and a dynamic component,
   wherein the dynamic component of the set-point signal is filtered according to at least two predetermined thresholds defining at least three separate filtering zones including a first filtering zone, a second filtering zone, and a third filtering zone,
   wherein a filter of order n is used in the first filtering zone and the third filtering zone, and
   wherein a maximum slope is imposed in the second filtering zone on the dynamic component of the set-point signal, the maximum slope being adjustable according to predetermined input data.

2. The method as claimed in claim 1, wherein the dynamic component of the set-point signal intended for the wheels of the motor vehicle is adapted to a direction of variation of the dynamic component of the set-point signal intended for the wheels of the motor vehicle.

3. The method as claimed in claim 2, wherein a first value of the dynamic component of the filtered set-point signal of each of the filtering zones is initialized with a last value of the dynamic component of the filtered set-point signal of a preceding one of the filtering zones.

4. The method as claimed in claim 1, wherein a second filtering zone of the filtering zones in which the maximum slope is imposed includes a torque transition point at which the dynamic component changes from a positive value to a negative value or from the negative value to the positive value.

5. A device for controlling an automatic transmission of a power train for a motor vehicle configured to deliver a torque set-point signal to be applied to wheels of the vehicle, adapted to inputs of a driver of the motor vehicle, comprising:
   two components, respectively a static component and a dynamic component; and
   a filtering block configured to filter the dynamic component of the set-point signal, the filtering block comprising means for comparing with at least two predetermined thresholds, the dynamic component of the set-point signal intended for the wheels of the motor vehicle and adapted to the inputs of the driver, and means for determining, from a plurality of separate filtering zones, a filtering zone corresponding to one of the thresholds reached by the dynamic component of the set-point signal.

6. The device as claimed in claim 5, wherein the filtering block comprises means for applying a filter of order n or a maximum slope to the dynamic component of the first set-point signal in an appropriate one of the filtering zones.

7. The device as claimed in claim 6, wherein the plurality of separate filtering zones includes a first filtering zone, a second filtering zone, and a third filtering zone, and the filter of order n is used in the first filtering zone and the third filtering zone, and the maximum slope is imposed in the second filtering zone.

8. The method as claimed in claim 7, wherein the second filtering zone in which the maximum slope is imposed includes a torque transition point at which the dynamic component changes from a positive value to a negative value or from the negative value to the positive value.

9. The device as claimed in claim 5, wherein a first value of the dynamic component of the filtered set-point signal of each of the filtering zones is initialized with a last value of the dynamic component of the filtered set-point signal of a preceding one of the filtering zones.

10. A device for controlling an automatic transmission of a power train for a motor vehicle configured to deliver a torque set-point signal to be applied to wheels of the vehicle, adapted to inputs of a driver of the motor vehicle, comprising:
    two components, respectively a static component and a dynamic component; and
    a filtering block configured to filter the dynamic component of the set-point signal by comparing with at least two predetermined thresholds, the dynamic component of the set-point signal intended for the wheels of the motor vehicle and adapted to the inputs of the driver, and determining, from a plurality of separate filtering zones, a filtering zone corresponding to one of the thresholds reached by the dynamic component of the set-point signal.

11. The device as claimed in claim 10, wherein the filtering block applies a filter of order n or a maximum slope to the dynamic component of the first set-point signal in an appropriate one of the filtering zones.

12. The device as claimed in claim 11, wherein the plurality of separate filtering zones includes a first filtering zone, a second filtering zone, and a third filtering zone, and the filter of order n is used in the first filtering zone and the third filtering zone, and the maximum slope is imposed in the second filtering zone.

13. The device as claimed in claim 12, wherein the second filtering zone in which the maximum slope is imposed includes a torque transition point at which the dynamic component changes from a positive value to a negative value or from the negative value to the positive value.

14. The device as claimed in claim 10, wherein a first value of the dynamic component of the filtered set-point signal of each of the filtering zones is initialized with a last value of the dynamic component of the filtered set-point signal of a preceding one of the filtering zones.

* * * * *

UNITED STATES PATENT AND TRADEMARK OFFICE
CERTIFICATE OF CORRECTION

PATENT NO. : 7,706,952 B2 Page 1 of 1
APPLICATION NO. : 11/596864
DATED : April 27, 2010
INVENTOR(S) : Roudeau et al.

It is certified that error appears in the above-identified patent and that said Letters Patent is hereby corrected as shown below:

On the title page, Item (86), the PCT information is incorrect. Item (86) should read:
-- (86) PCT No.:  PCT/FR2005/050386

§371 (c)(1),
(2), (4) Date: Feb. 6, 2007 --

Signed and Sealed this

Sixth Day of July, 2010

David J. Kappos
*Director of the United States Patent and Trademark Office*